United States Patent
Dethmers

(10) Patent No.: US 11,655,071 B2
(45) Date of Patent: May 23, 2023

(54) CONTAINER HAVING A CONTAINER BODY AND A HANDLE ANCHORED THERETO AND METHOD FOR MANUFACTURING SUCH A CONTAINER

(71) Applicant: Dethapak B.V., Ootmarsum (NL)

(72) Inventor: Nicola Louis Dethmers, Ootmarsum (NL)

(73) Assignee: Dethapak Innovation B.V., Ootmarsum (NL)

( * ) Notice: Subject to any disclaimer, the term of this patent is extended or adjusted under 35 U.S.C. 154(b) by 719 days.

(21) Appl. No.: 16/478,766

(22) PCT Filed: Jan. 18, 2018

(86) PCT No.: PCT/NL2018/050038
§ 371 (c)(1),
(2) Date: Jul. 17, 2019

(87) PCT Pub. No.: WO2018/135944
PCT Pub. Date: Jul. 28, 2018

(65) Prior Publication Data
US 2020/0055632 A1    Feb. 20, 2020

(30) Foreign Application Priority Data

Jan. 18, 2017   (NL) ..................................... 2018188

(51) Int. Cl.
*B29C 49/20*     (2006.01)
*B65D 23/10*     (2006.01)
(Continued)

(52) U.S. Cl.
CPC ............ *B65D 23/104* (2013.01); *B29C 49/06* (2013.01); *B29C 49/20* (2013.01);
(Continued)

(58) Field of Classification Search
CPC ............ B65D 23/104; B65D 2525/281; B29C 2049/2039; B29C 49/20
See application file for complete search history.

(56) References Cited

U.S. PATENT DOCUMENTS 2,641,374 A    6/1953   Der Yuen
5,338,503 A *  8/1994   Yanagisawa .......... B29C 31/008
                                                    264/516
(Continued)

FOREIGN PATENT DOCUMENTS

EP    2749398 A1    7/2014
EP    2987743 A1    2/2016
(Continued)

OTHER PUBLICATIONS

Partial machine translation of JP 04-201541 A dated Jul. 1992 obtained from the espace website. (Year: 1992).*

(Continued)

*Primary Examiner* — Robert B Davis
(74) *Attorney, Agent, or Firm* — Leydig, Voit & Mayer, Ltd.

(57) ABSTRACT

A container having a container body and a handle mounted thereto. The handle has a grip portion and a mounting bracket, a gripping area being left free between said grip portion and said mounting bracket for gripping the grip portion. An anchoring portion is arranged on a side of the mounting bracket facing away from the grip portion. The (Continued)

anchoring portion and the grip portion are elongate in a first, horizontal direction. The anchoring portion has a single wall stem portion oriented in a plane in said first direction and in a second direction away from the grip portion and a hooking portion projecting from the stem portion in a third direction transverse to said plane. A method for manufacturing such a container is also described.

7 Claims, 6 Drawing Sheets

(51) Int. Cl.
  *B29C 49/06* (2006.01)
  *B29L 31/46* (2006.01)
(52) U.S. Cl.
  CPC . *B29C 2049/2039* (2013.01); *B29L 2031/463* (2013.01); *B65D 2525/281* (2013.01)

(56) References Cited

U.S. PATENT DOCUMENTS

| 5,469,612 | A | 11/1995 | Collette et al. |
| 5,637,167 | A | 6/1997 | Krishnakumar et al. |
| 6,797,349 | B2 * | 9/2004 | Taniguchi ............... B29C 49/20 264/150 |
| 7,600,655 | B2 * | 10/2009 | Agrawal ............... B29C 66/532 215/396 |
| 2004/0056053 | A1 * | 3/2004 | Hollander ............ B65D 23/104 222/466 |

FOREIGN PATENT DOCUMENTS

| EP | 3056445 A1 * | 8/2016 | ........... B65D 23/104 |
| JP | 04201541 A * | 7/1992 | ............. B29C 49/24 |
| JP | 05154897 A * | 6/1993 | ........... B65D 23/106 |
| JP | 08217075 A * | 8/1996 | ........... B65D 23/104 |
| JP | 08217075 A | 8/1996 | |
| JP | 2006103003 A | 4/2006 | |
| JP | 2007230603 A | 9/2007 | |
| JP | 2009234637 A | 10/2009 | |
| WO | 2014000776 A1 | 1/2014 | |

OTHER PUBLICATIONS

Partial machine translation of JP 05-154897 A dated Jun. 1993 obtained from the espace website. (Year: 1993).*
Partial machine translation of JP 08-217075 A dated Aug. 1996 obtained from the espace website. (Year: 1996).*
European Patent Office, International Search Report and Written Opinion in corresponding International Application No. PCT/NL2018/050038 dated Apr. 18, 2018 (10 pages).

* cited by examiner

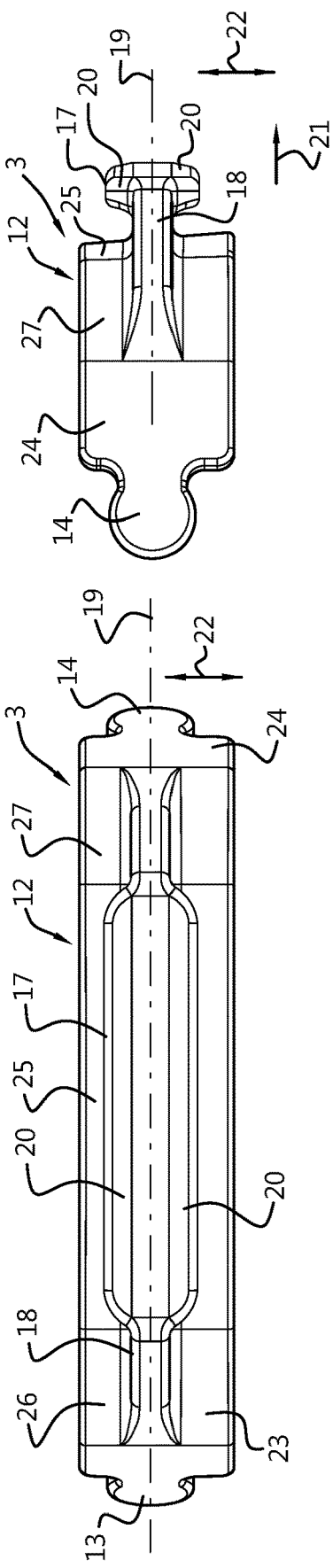

CONTAINER HAVING A CONTAINER BODY AND A HANDLE ANCHORED THERETO AND METHOD FOR MANUFACTURING SUCH A CONTAINER

CROSS-REFERENCE TO RELATED APPLICATIONS

This patent application is a U.S. National Phase of PCT International Application No. PCT/NL2018/050038, filed Jan. 18, 2018, which claims priority to Netherlands Application No. 2018188, filed Jan. 18, 2017, which are both expressly incorporated by reference in their entireties, including any references contained therein.

FIELD AND BACKGROUND OF THE INVENTION

The present invention relates to a container having a container body and a handle mounted thereto and to a method for manufacturing such a container.

Blow moulded containers with handles are known in numerous forms, many with integrally formed handles. However, many designs are compromised ergonomically and/or from the point of optimal use of storage space. Moreover, it is technically difficult and relatively expensive to mould a handle integrally with a side portion of a container.

Therefore, other designs provide for a separately manufactured handle that is then attached to the container body. For instance, U.S. Pat. Nos. 5,469,612 and 5,637,167 disclose container bodies each having a handle fitted thereto by elastically deforming the handle and allowing the handle to spring back into engagement with the container body. A problem of such containers is that the handles tend to become dislodged from the container body relatively easily, in particular if the container body has a large internal volume and is accordingly heavy when full.

U.S. Pat. No. 5,637,167 also discloses a container body having a handle fitted thereto by snapping studs of the handle into hollow posts projecting inwardly into the container body. Such containers are difficult to manufacture, in particular because of the need of forming the hollow posts. Moreover, the studs can snap out of the hollow posts relatively easily.

U.S. Pat. No. 5,637,167 also discloses a container body having a handle fitted thereto by sliding over a dovetail boss of the container body. Such a container is relatively expensive, because the container body and the handle are difficult to mould.

European patent application 2 749 398 and Japanese patent application 2006-103003 disclose containers with handles that are insert moulded to the container body during blow moulding. The handles are oriented vertically, which allows arranging the handle in a plane where the mould halves meet during moulding and along which the mould splits during opening. However, handles with a vertically oriented grip portion are impractical for lifting larger containers, that are accordingly heavy when filled.

Also Japanese patent application 2009-234637 discloses a handle with a vertical grip portion insert moulded to a container body, as the container body is blow moulded. The handle has a mounting bracket portion that is anchored to the wall of the container body.

European patent application 2 013 345 discloses a container of which a handle is mounted to the container body so that the grip portion of the handle is elongate in a horizontal direction. This allows the container to be lifted and handled easily when the container is full. However, the handle has to be mounted after manufacturing.

SUMMARY OF THE INVENTION

It is an object of the invention to provide a user-friendly container with a container body and a handle mounted thereto with a horizontal grip portion of which manufacturing costs are low and of which the hanclle has a high resistance against becoming dislodged.

According to the invention, this object is achieved by providing a container having a container body and a handle mounted thereto, the container body having a container wall bounding a storage space, an opening communicating with the storage space at an upper end of the container body and a bottom at a lower end of the container body, the container wall extending between the opening and the bottom and having an outer surface, the container body further having a cavity in the container wall, wherein the handle has a grip portion and a mounting bracket extending between opposite ends of the grip portion, a gripping area being left free between the grip portion and the mounting bracket, for allowing a portion of a hand of a user to enter between the mounting bracket and the grip portion for gripping the grip portion, and wherein an anchoring portion is arranged on a side of the mounting bracket facing away from the grip portion and projecting into the cavity;

wherein the anchoring portion and the grip portion are elongate in a first horizontal direction; and wherein the anchoring portion has a single wall stem portion oriented in a plane in the first, horizontal direction and in a second direction away from the grip portion and a hooking portion projecting from the stem portion in a third direction transverse to the plane.

Because the anchoring portion has a single wall stem portion oriented in a plane in the horizontal direction and in a direction away from the grip portion and a hooking portion projecting from the stem portion in a direction transverse to that plane, the handle with the anchoring portion can efficiently be moulded in a mould of which mould halves meet along a mould plane parallel to the plane in which wall portion of the anchoring portion is oriented. Because the anchoring portion is elongate in the horizontal direction, wall material of the container body being blow moulded mainly needs to stretch additionally in vertical directions, in which directions the wall material can accommodate relatively easily to the shape of the anchoring portion forming a cavity closely enclosing the anchoring portion and bulging out between the hooking portion and the mounting bracket portion of handle to an extent that is sufficient for reliably anchoring the handle in wall material of the container body. Furthermore, because the anchoring portion is elongate in the horizontal directions, forces transferred from the handle to the container body as the container is lifted are distributed over a relatively large area, so that stress concentrations remain limited.

According to the invention, this object is further achieved by providing a method of manufacturing a container with a handle, comprising:

providing a preform having an opening and bounding a cavity accessible via the opening;

providing a handle having a grip portion and a mounting bracket extending between opposite ends of the grip portion, a gripping area being left free between the grip portion and the mounting bracket for allowing a portion of a hand of a user to enter between the mounting bracket and the grip portion for gripping the grip portion, wherein an anchoring portion is arranged on a side of the mounting bracket facing away from the grip portion, the anchoring portion having a stem portion oriented in a direction away from the grip portion and a hooking portion projecting from the stem portion in a direction transverse to the direction away from the grip portion;

positioning the preform and the handle in a blow moulding mould, wherein the opening is positioned in an opening of the mould and the handle is positioned in a recess, such that the mounting bracket and the anchoring portion close off the recess against entry therein of wall material during blow moulding;

bringing a grip member in a portion engaging the grip portion and projecting at least partially into the gripping area;

closing the mould and blowing up the preform in the mould into a container body having a container wall bounding a storage space, an opening communicating with the storage space at an upper end of the container body and a bottom at a lower end of the container body, the container wall extending between the opening and the bottom, the container body further having a cavity in the container wall engaging the anchoring member such that the handle is anchored to the container body;

opening the mould and retracting the grip member from the position engaging the grip portion and projecting at least partially into the gripping area; and removing the container body with the handle attached thereto from the mould.

Because a grip member is brought in a position engaging the grip portion and projecting at least partially in the gripping area, the handle is securely retained in its position in the recess, even if the mould is closed quickly. After opening of the mould, the container including the handle can be removed out of the mould, because the grip member is retracted from its position engaging the grip portion and projecting at least partially into the gripping area.

Particular elaborations and embodiments of the invention are set forth in the dependent claims.

Further features, effects and details of the invention appear from the detailed description and the drawings.

BRIEF DESCRIPTION OF THE DRAWINGS

FIG. 2 is a side view of a hanclle of the container shown in FIG. 1;

FIG. 3 is a side view of the handle of FIG. 2, in a direction of view perpendicular to the direction of view of FIG. 2;

FIG. 4 is a top plan view of the handle shown in FIGS. 2 and 3;

DETAILED DESCRIPTION

First, the invention is discussed with reference to an example of a container 1 according to the invention shown in FIGS. 1-5. The container 1 has a container body 2 and a handle 3 mounted thereto. The container body 2 has a container wall 4 bounding a storage space inside the container wall 4 that surrounds the storage space. The container body 2 may for instance be blow moulded from a tube or preform of plastic material such as Polyethylene terephthalate (PET) or a polyolefin such as Polyethylene (PE) or Polypropylene (PP). Providing a blow moulded container with a handle mounted thereto is particularly advantageous for containers with a container body of PET material, in view of the limited deformability of PET material during moulding and the resulting constraints regarding deformability and the particular suitability of PET material for forming containers of sufficient strength to carry a large volume of a product and, accordingly, a large weight.

Figure 10:
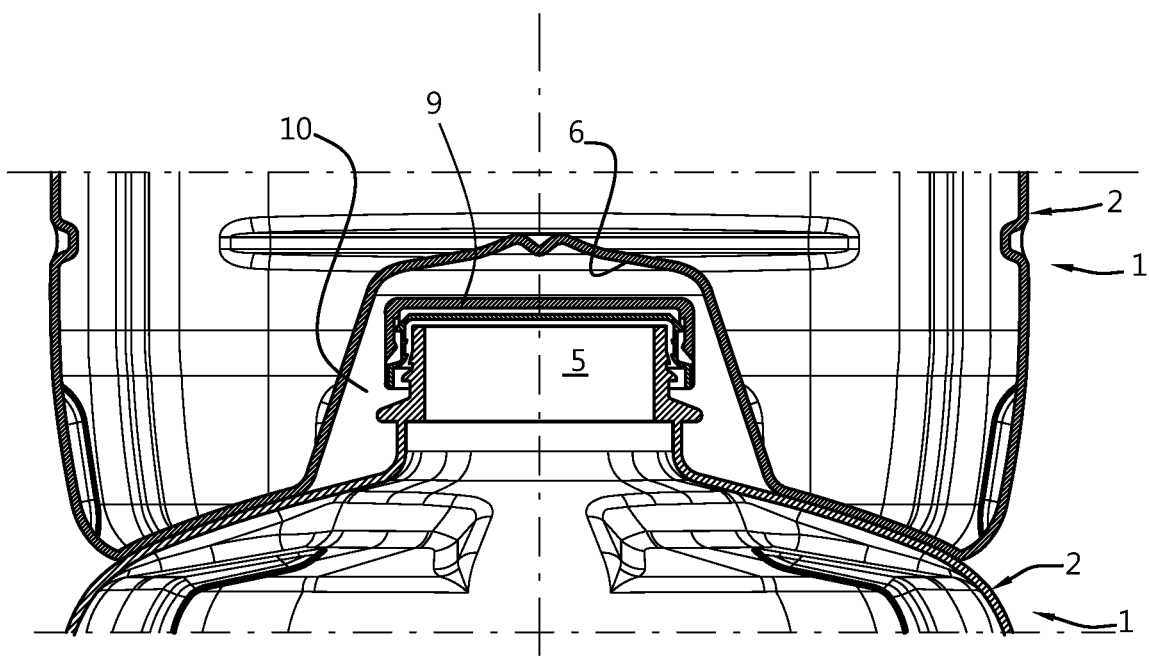
FIG. 10 is a cross-sectional side view of lower and upper end portions of two stacked containers according to FIG. 1.

The container body 2 has an opening 5 communicating with the storage space at an upper end of the container body 2 and a bottom 6 at a lower end of the container body. The container wall 4 extends between the opening 5 and the bottom 6. In the container body 2, a recess 8 is formed in which the handle 3 is accommodated. Thus, the handle 3 does not project from the container body and allows the opening 5 and a closure 9 (see FIG. 10) mounted thereto, to be received in a relatively small recess 10 (see FIG. 10) of a container 1 stacked on top of the container 1.

The handle 3 has a grip portion 11 for gripping of the handle 3 by a hand of a user. A mounting bracket 12 extends between opposite ends 13, 14 of the grip portion 11. A gripping area 15 is left free between the grip portion 11 and the mounting bracket 12 for allowing a portion of a hand of a user to enter between the mounting bracket 12 and the grip portion 11 for gripping the grip portion 11.

The handle 3 further has an anchoring portion 17 arranged on a side of the mounting bracket 12 facing away from the grip portion 11 and projecting into a cavity 7 formed in wall material of the recess 8. The anchoring portion 17 and the grip portion 11 are elongate in horizontal directions (double arrow 16). The anchoring portion 17 has a single wall stein portion 18 oriented in a plane 19 in the horizontal directions 16 and in a direction (arrow 21) away from the grip portion 11 and hooking portions 20 projecting from the stem portion 18 in directions (double arrow 22) transverse to the plane 19.

Because the anchoring portion 17 has a single wall stein portion 18 oriented in a plane 19 in the horizontal directions 16 and in a direction 21 away from the grip portion 11 and the hooking portions 20 project from the stein portion 18 in one or more directions 22 transverse to that plane 19, the handle 3 with the anchoring portion 17 can efficiently be moulded in a mould of which mould halves meet along a mould plane parallel to the plane 19 in which stem portion 18 of the anchoring portion 17 is oriented. For efficiently manufacturing the handles 3, it is preferably injection moulded of polymer material.

For easy unmoulding of the handle 3, it is advantageous if the handle 3 is also otherwise of a releasing shape. To this end, the handle 3 is free from projections projecting from the side of the mounting bracket 12 facing away from the grip portion 11 into space located transversely of the anchoring portion 17.

Figure 1:
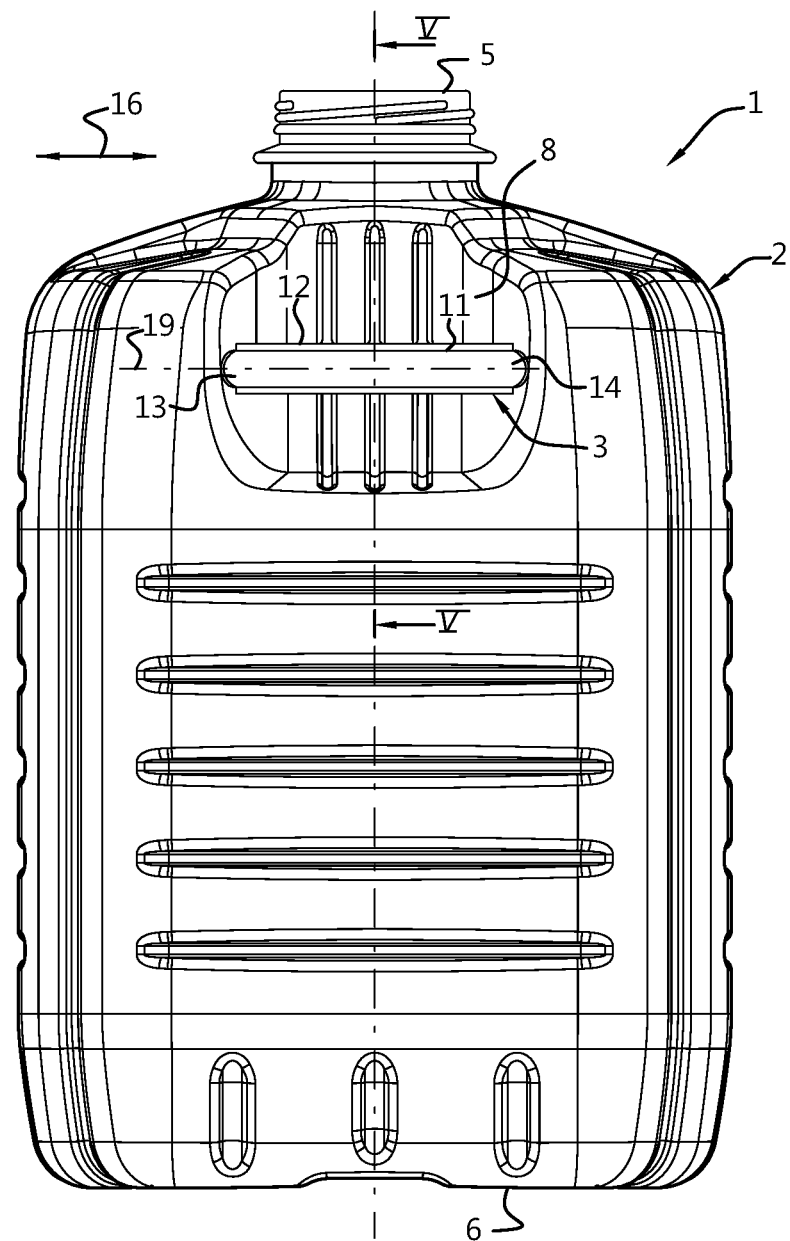
FIG. 1 is a side view an example of a container according to the invention.
Figure 5:
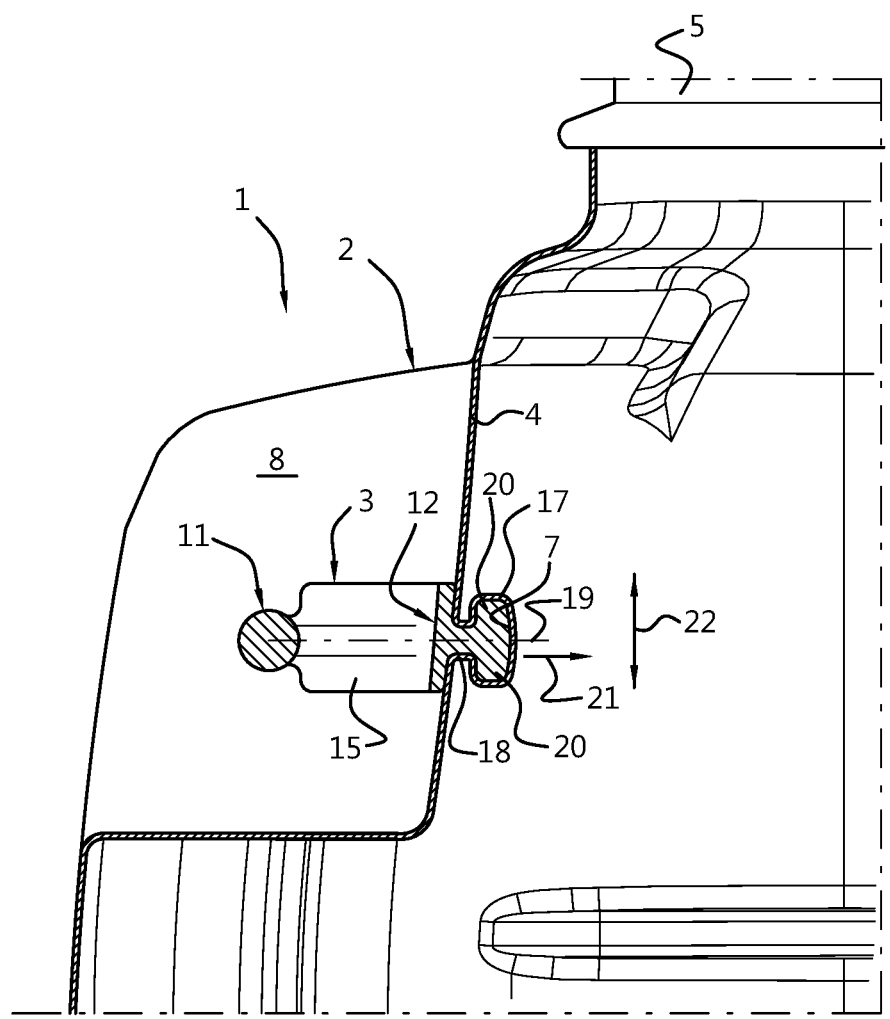
FIG. 5 is a cross-sectional side view along line V-V in FIG. 1 of a portion of the container shown in FIG. 1.

Because the anchoring portion 17 is elongate in the horizontal direction, wall material 4 of the container body 2 being blow moulded mainly needs to stretch additionally in vertical directions 22. In these vertical directions 22, the wall material 4 is stretched to a relatively small extent during blow moulding. As is illustrated by FIG. 5, this allows the wall material to accommodate relatively easily to the shape of the anchoring portion 17 and form an anchoring member retaining cavity 7 shaped closely along the anchoring portion including portions bulging out between the hooking portions 20 and the mounting bracket portion 12 of the handle 3 to an extent that is sufficient for reliably anchoring the handle 3 in wall material 4 of the container body 2, in particular if the (vertical) height of the container body is larger than the (horizontal) width or depth. This is particularly advantageous if the container body is of polyethylene terephthalate (PET) material, which has a limited deformability due to strain hardening, but is particularly suitable as a material for container bodies of large containers in view of its high strength and creep resistance.

Furthermore, because the anchoring portion 17 is elongate in the horizontal directions 16, forces transferred from the handle 3 to the container body 2 are distributed over a relatively large area, so that stress concentrations remain limited.

In the present example, the anchoring portion 17 has hooking portions 20 projecting in opposite directions transverse to the plane 19 from the stem portion 18. This is advantageous for obtaining a particularly firm and reliable anchoring of the handle 3 to the container body 2. It is however also possible to provide an anchoring portion with one or more hooking portions projecting from the stem portion in a common direction only.

For resisting vertical forces exerted onto the grip portion 11, which result in a couple exerted onto the anchoring member 17, it is furthermore advantageous if, as in the present example, the mounting bracket 12 is curved in the horizontal plane 19. For the same purpose, it is also advantageous if the anchoring portion 17 is curved in the horizontal plane 19. The curved mounting bracket 12 and anchoring portion 17 rest against wall portions of the recess 8 that are curved closely along with the mounting bracket 12 and the anchoring portion 17, so that additional support is obtained against tilting of the handle 3 about an axis in the direction 16 in which the mounting bracket 12 and the anchoring portion 17 are elongate.

Furthermore, resistance against tilting of the handle 3 is particularly high, because the mounting bracket portion 12 has end portions 23, 24 extending from the grip portion 11, a central portion 25 opposite of the grip portion 11 and transition portions 26, 27 each between an end of the central portion 25 and one of the end portions 23, 24, the transition portions 26, 27 are more curved than the central portion 25 and the stem portion 18 of the anchoring member 17 embraces the central portion 25 and at least adjacent portions of the transition portions 26, 27. Thus, tilting of the anchoring portion 17 is further reduced since tilting moments are transferred to curved wall portions of the recess 8 shaped closely along the curved anchoring portion 17.

Figure 6:
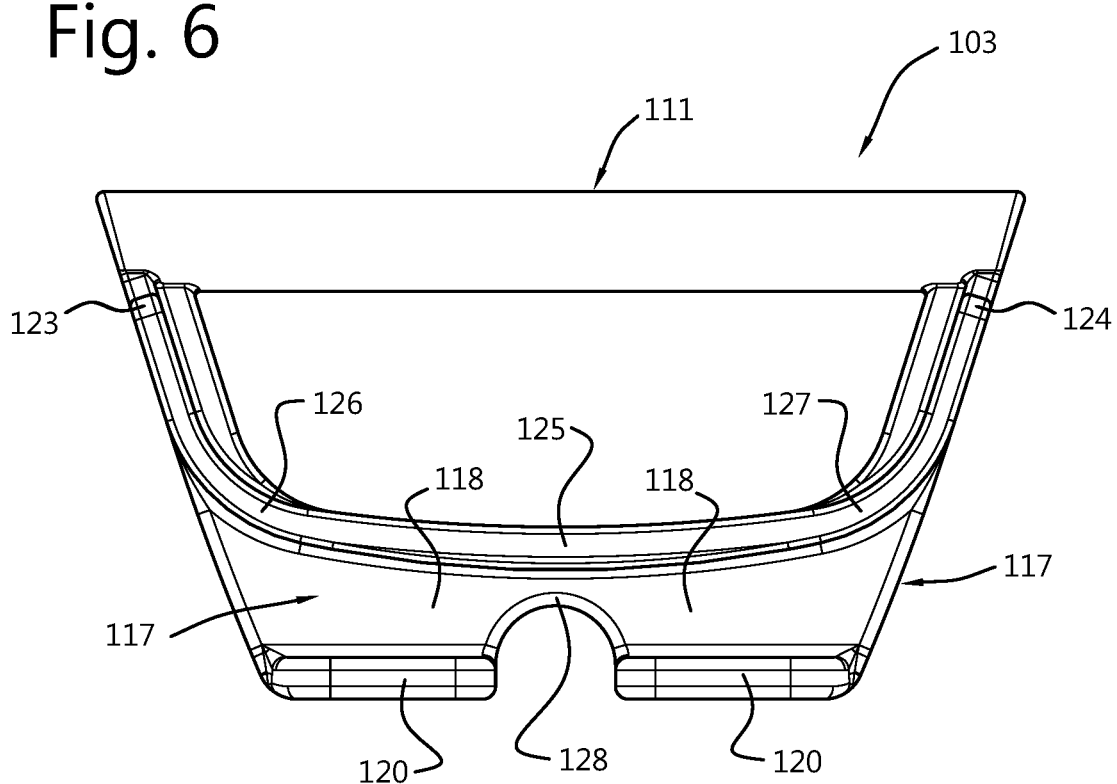
FIG. 6 is a top plan view of a handle of another example of a container according to the invention.
Figure 7:
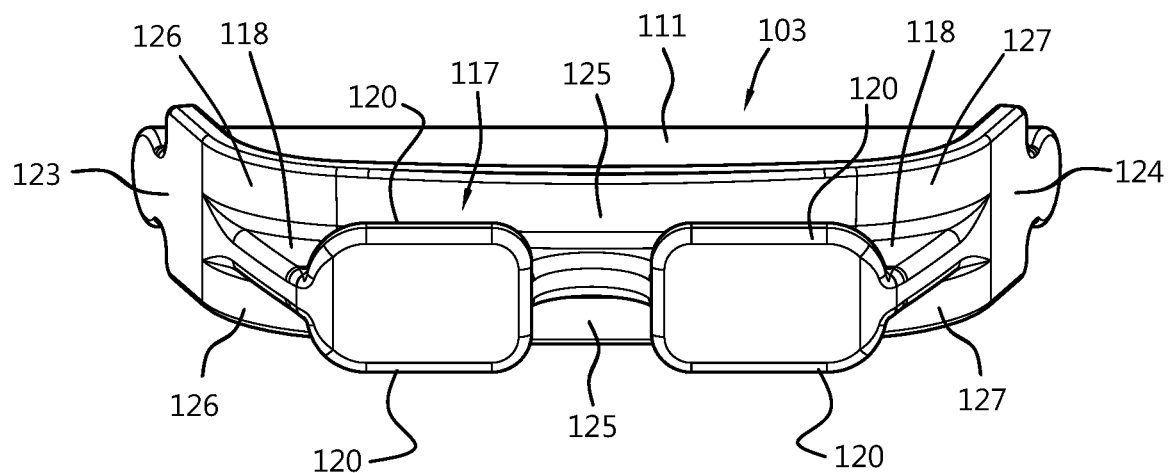
FIG. 7 is a perspective view of the handle shown in FIG. 6.

In FIGS. 6 and 7 a handle 103 of an alternative example of a container according to the invention is shown. In this example, the handle 103 has two anchoring portions 117. By providing two or more anchoring portions, preferably in row in longitudinal direction of the grip portion 111, during blow moulding relatively straight wall portions are formed between successive portions of wall material bulged around the hooking portions 120 and the stem portions 118 of the anchoring portions 117. This allows forces exerted by the anchoring portions 117 to be transferred to adjacent more straight wall portions in a larger number of locations and accordingly, a more stiff mounting of the handle 103. In this example, a bridge portion 128 interconnects the anchoring portions 117, the depth of the recess between the anchoring portions up to the bridge 128 being selected to match deformability of the wall material during blow moulding, so that the wall material exerts some outward pretension onto the bridge portion 128 and has a wedging effect centering the bridge portion 128 vertically in a deepest indent in the wall material at the bridge portion 128. Thus, vertical play or initial easy movability in the mounting of the handle 103 is reduced, so that the container feels solid to a user.

Figure 8:
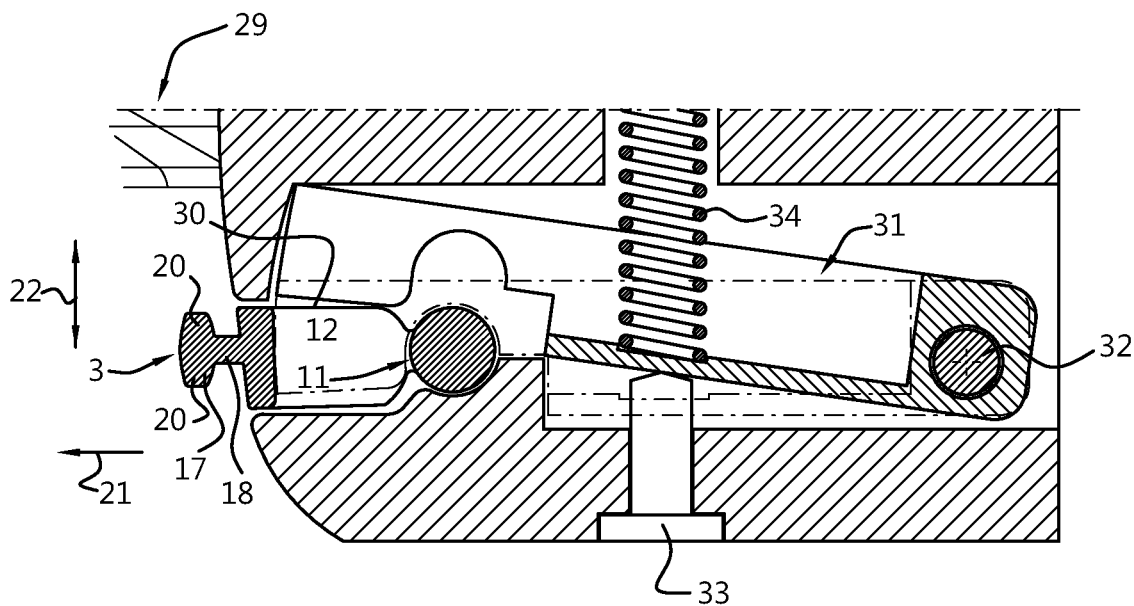
FIG. 8 is a cross-sectional side view of a portion of a mould for blow moulding a container according to FIG. 1 and a handle positioned therein.
Figure 9:
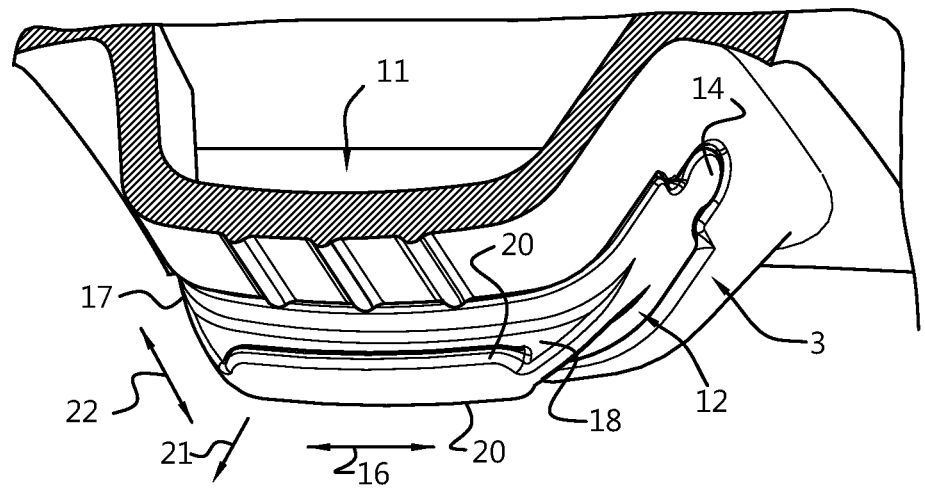
FIG. 9 is a cut-away perspective view of the mould portion shown in FIG. 8.

In FIGS. 8 and 9 a portion of a mould for manufacturing a container according to the invention is shown for illustrating of manufacturing steps of an example of a method according to the invention. For manufacturing a container according to the invention, first, a preform 3 having an opening 5 and bounding a cavity accessible via the opening 5 is provided. Also, a handle 3 as described is provided.

The preform (not visible in FIGS. 8 and 9) and the handle 3 are positioned in the blow moulding mould 29 with the opening 5 of the preform positioned in an opening of the mould 29 and the handle 3 positioned in a recess 30, such that the mounting bracket 12 and the anchoring portion 17 close off the recess 30 against entry therein of wall material during blow moulding. Next, a grip member 31 is brought from a retracted position (shown in FIG. 8 in full lines) in a handle engaging position (shown in FIG. 8 in dash-and-dot lines) engaging the grip portion 11 and projecting partially into the gripping area 15.

Then the mould 29 is closed in a direction 21 and the heated preform is blown, so that it is inflated against internal surfaces of the mould 29 and thereby shaped into a container body 2 having a container wall 4 bounding a storage space, an opening 5 communicating with the storage space at an upper end of the container body 2. The container body 2 accommodates to the shape of the anchoring portion 17, so that a recess is formed (see FIG. 5) closely along and engaging the anchoring member 17 such that the handle 3 is anchored to the container body 2.

After the container body 2 has cooled down sufficiently to resist deformation if the mould 29 is opened, the mould 29 is opened and the grip member 31 is retracted from its position engaging the grip portion 11 and projecting at least partially into the gripping area 15, so that the handle 3 is released. Then, the container body 2 with the handle 3 attached thereto is removed from the mould.

Because the grip member 31 is brought in a position engaging the grip portion 11 and projecting at least partially in the gripping area 15, the handle 3 is securely retained in its position in the recess 30, even if the mould 29 is closed quickly. After opening of the mould 29, the container including the handle 3 can be removed out of the mould 29, because the grip member 31 is retracted from its position engaging the grip portion and projecting at least partially into the gripping area 15.

That the handle is retained in the recess 30 is particularly advantageous if, as in the present example, closing and opening of the mould 29 is in direction 21 and opposite thereto transverse to the directions 16 in which the grip portion 11 is elongate, because it is avoided that the handle 3 moves out of the recess 30 partially or completely, due to deceleration of the mould half in which the handle 3 has been positioned.

Movement of the grip member 31, which is suspended pivotably about an axis 32, is driven by a pneumatic piston 33 against counter pressure exerted by a helical spring 34. However, other actuators, such as electric actuators or mechanical actuators coupled to move as a result of movement of a mould half may also be provided.

Several features have been described as part of the same or separate embodiments. However, it will be appreciated that the scope of the invention also includes embodiments having combinations of all or some of these features other than the specific combinations of features embodied in the examples.

The invention claimed is:

1. A container having a container body and a handle mounted thereto,
the container body having a container wall bounding a storage space, an opening communicating with the storage space at an upper end of the container body and a bottom at a lower end of the container body, the container wall extending between said opening and said bottom and having an outer surface, the container body further having at least two cavities in said container wall,
wherein the handle has a grip portion and a mounting bracket extending between opposite ends of said grip portion, a gripping area being left free between said grip portion and said mounting bracket, for allowing a portion of a hand of a user to enter between the mounting bracket and the grip portion for gripping the grip portion,
wherein at least two anchoring portions are arranged on a side of the mounting bracket facing away from the grip portion and projecting into said at least two cavities, respectively,
wherein the at least two anchoring portions and the grip portion are elongate in a first horizontal direction,
wherein the at least two anchoring portions have at least two single wall stem portions, respectively, oriented in a plane in said first, horizontal direction and in a second direction away from the grip portion and at least two hooking portions, respectively, projecting from the at least two single wall stem portions, respectively, in a third direction transverse to said plane,
wherein said mounting bracket is curved in said plane,
wherein said at least two anchoring portions are curved in said plane, and
wherein said mounting bracket has end portions extending from said grip portion, a central portion opposite of said grip portion and transition portions each between an end of the central portion and one of said end portions, the transition portions being more curved than said central portion and the at least two single wall stem portions of said at least two anchoring portions, respectively, embracing said central portion and at least adjacent portions of said transition portions.

2. The container according to claim 1, wherein said at least two hooking portions further project from the at least two single wall stem portions, respectively, in a fourth direction transverse to said plane opposite to said third direction.

3. The container according to claim 1, wherein said handle is free from projections projecting from the side of the mounting bracket facing away from the grip portion into space located transversely of the at least two anchoring portions.

4. The container according to claim 1, wherein said container body is of polyethylene terephthalate material.

5. The container according to claim 1, wherein the handle is injection moulded of a polymer material.

6. A method of manufacturing a container with a handle, the method comprising:
providing a preform having an opening and bounding a cavity accessible via said opening;
providing a handle having a grip portion and a mounting bracket extending between opposite ends of said grip portion, a gripping area being left free between said grip portion and said mounting bracket for allowing a portion of a hand of a user to enter between the mounting bracket and the grip portion for gripping the grip portion, wherein at least two anchoring portions are arranged on a side of the mounting bracket facing away from the grip portion, and wherein the at least two anchoring portions and the grip portion of the container with the handle are elongate in a first direction, the at least two anchoring portions having:
at least two single wall stem portions, respectively, oriented in a plane in said first direction and in a second direction away from said grip portion, and
at least two hooking portions, respectively, projecting from the at least two single wall stem portions, respectively, in a third direction transverse to said plane;
positioning the preform and the handle in a blow moulding mould, wherein the opening is positioned in an opening of the mould and the handle is positioned in a recess, such that the mounting bracket and the at least two anchoring portions close off the recess against entry therein of wall material during blow moulding;
bringing a grip member in a position engaging the grip portion and projecting at least partially into said gripping area;
closing the mould and blowing up the preform in the mould into a container body having a container wall bounding a storage space, an opening communicating with the storage space at an upper end of the container body and a bottom at a lower end of the container body, the container wall extending between said opening and said bottom, the container body further having at least two cavities in said container wall engaging said at least two anchoring portions, respectively, such that the handle is anchored to said container body;
opening the mould and retracting said grip member from said position engaging the grip portion and projecting at least partially into said gripping area; and
removing the container body with the handle attached thereto from the mould;
wherein said first direction corresponds to a horizontal direction as seen when the container body with the handle is placed with said bottom on a horizontal floor;
wherein said mounting bracket is curved in said plane,
wherein said at least two anchoring portions are curved in said plane, and
wherein said mounting bracket has end portions extending from said grip portion, a central portion opposite of said grip portion and transition portions each between an end of the central portion and one of said end portions, the transition portions being more curved than said central portion and the at least two single wall stem portions of said at least two anchoring portions, respectively, embracing said central portion and at least adjacent portions of said transition portions.

7. The method according to claim 6, wherein the closing and the opening of the mould is in a direction transverse to said first direction.

* * * * *

UNITED STATES PATENT AND TRADEMARK OFFICE
CERTIFICATE OF CORRECTION

| | | |
|---|---|---|
| PATENT NO. | : 11,655,071 B2 | Page 1 of 1 |
| APPLICATION NO. | : 16/478766 | |
| DATED | : May 23, 2023 | |
| INVENTOR(S) | : Nicola Louis Dethmers | |

It is certified that error appears in the above-identified patent and that said Letters Patent is hereby corrected as shown below:

On the Title Page

Item (87) should read -- PCT Pub. Date: Jul. 26, 2018 --.

Signed and Sealed this
Third Day of October, 2023

*Katherine Kelly Vidal*

Katherine Kelly Vidal
*Director of the United States Patent and Trademark Office*